United States Patent
Villar et al.

(10) Patent No.: US 10,848,488 B2
(45) Date of Patent: Nov. 24, 2020

(54) SYSTEM AND A COMPUTER-IMPLEMENTED METHOD FOR MACHINE-TO-MACHINE AUTHENTICATION OF AN APPARATUS

(71) Applicant: The Boeing Company, Chicago, IL (US)

(72) Inventors: Victor Perez Villar, Madrid (ES); Grzegorz M. Kawiecki, Madrid (ES)

(73) Assignee: The Boeing Company, Chicago, IL (US)

(*) Notice: Subject to any disclaimer, the term of this patent is extended or adjusted under 35 U.S.C. 154(b) by 234 days.

(21) Appl. No.: 15/907,839

(22) Filed: Feb. 28, 2018

(65) Prior Publication Data
US 2018/0255458 A1 Sep. 6, 2018

(30) Foreign Application Priority Data
Mar. 3, 2017 (EP) .................................... 17382110

(51) Int. Cl.
*H04L 29/06* (2006.01)
*H04W 12/06* (2009.01)
(Continued)

(52) U.S. Cl.
CPC .......... *H04L 63/0876* (2013.01); *G06F 21/44* (2013.01); *H04W 4/70* (2018.02);
(Continued)

(58) Field of Classification Search
CPC ......... H04W 12/06; H04W 4/70; H04W 4/10; G06F 21/44; H04L 63/0876; B64C 39/024; B64C 2201/141; B64C 2045/0085
(Continued)

(56) References Cited

U.S. PATENT DOCUMENTS 9,309,009 B1 4/2016 Poux et al.
2003/0145205 A1* 7/2003 Sarcanin ................ G06Q 20/02
713/172
(Continued)

FOREIGN PATENT DOCUMENTS

WO WO 2016/025044 2/2016

*Primary Examiner* — Michael S McNally
(74) *Attorney, Agent, or Firm* — Haynes and Boone, LLP

(57) ABSTRACT

A system and a method of authentication to improve security communication between machines are disclosed. The system includes a retrieving unit (120) that identifies a critical component (102) of an apparatus (110) in response to an authentication request for the apparatus (110) and retrieves authentication information for the critical component (102) comprising expected physical and digital signatures for the critical component (102) and one or more associated additional components (104). An acquiring unit (160) that acquires present signatures for the components (102, 104). A checking unit (180) that checks validity of each present signature with the corresponding expected signature, in order to authenticate the apparatus (110). The authentication process is enhanced by strategically extending the biometric concept, that is, measurement and analysis of unique physical or behavioral characteristics for verifying identity purposes, to interactions between machines. This new concept may be labeled as "machinemetric".

20 Claims, 9 Drawing Sheets

(51) Int. Cl.
  *H04W 4/70*   (2018.01)
  *H04W 4/80*   (2018.01)
  *G06F 21/44*  (2013.01)
  *B64D 45/00*  (2006.01)
  *B64C 39/02*  (2006.01)

(52) U.S. Cl.
  CPC ......... *H04W 4/80* (2018.02); *H04W 12/0605* (2019.01); *H04W 12/0609* (2019.01); *B64C 39/024* (2013.01); *B64C 2201/141* (2013.01); *B64D 2045/0085* (2013.01)

(58) Field of Classification Search
  USPC ............................................................ 726/5
  See application file for complete search history.

(56) References Cited

U.S. PATENT DOCUMENTS

| | | | | |
|---|---|---|---|---|
| 2005/0205673 A1* | 9/2005 | Morris | ................ | B01L 3/5027 |
| | | | | 235/385 |
| 2009/0046708 A1* | 2/2009 | Koziol | ................ | G06F 21/566 |
| | | | | 370/360 |
| 2012/0331164 A1* | 12/2012 | Wang | ................ | H04W 28/08 |
| | | | | 709/229 |
| 2016/0114886 A1* | 4/2016 | Downey | ............... | B64C 39/024 |
| | | | | 701/2 |

* cited by examiner

SYSTEM AND A COMPUTER-IMPLEMENTED METHOD FOR MACHINE-TO-MACHINE AUTHENTICATION OF AN APPARATUS

CROSS-REFERENCE TO RELATED APPLICATION

This application claims priority to, and the benefit of, European Patent Application No. EP 17382110.9, filed on Mar. 3, 2017, the entire disclosure of which is expressly incorporated by reference herein.

FIELD

The present disclosure is comprised in the field of telecommunication security. More particularly, it relates to machine-to-machine (M2M) authentication using an enhanced multi-factor authentication (MFA) mechanism.

BACKGROUND

Authentication is the process of determining whether someone or something is, in fact, who or what it purports to be. Traditionally, authentication has focused on interactions between human and machine, so the machine automatically verifies validity of an identified user. Recently, authentication is also intended for machine-to-machine environments (e.g., online backup services, telemedicine sensors, and smart grids). Several techniques are adopted to this end.

Certificate-based authentication technologies ensure authentication using a public and private encryption key that is unique. These tokens can also be used to digitally sign transactions. Normally, a Certificate Authority (CA) is responsible of issuing and verifying digital certificates as a part of the public key infrastructure.

There also exists technologies based on context-based authentication, which uses contextual information, e.g., GPS position, to determine whether a system identity is authentic or not. However, context-based authentication alone is insufficient and is usually complementary to other strong authentication techniques.

There are other authentication tools, like hardware and software tokens that generate random numbers or strings of characters that change every short time interval and are synchronized with the authenticating system. However, this kind of authentication tools needs to be connected to an authenticating system, which is a strong requirement that cannot be easily satisfied.

Likewise, there are authentication tools which are not suitable for a machine-to-machine environment because they are human-oriented (e.g., challenge response, biometric authentication, or out-of-band communication).

Digital certificates are not sufficient for authentication in many circumstances. For instance, they are not useful for Unmanned Aerial Systems (UAS) since the platform may carry many operational payloads, and digital certificates do not guarantee a secure use of added payloads.

Multi-factor authentication (MFA) technologies are based on one-time passwords that use a shared secret or seed that is stored on the authentication device on board and on the authentication backend. This technique ensures authentication by generating a one-time passcode based on the token's secret.

In summary, many of the currently available technologies for identity verification are not fully applicable to M2M environments. Traditionally, three questions need to be addressed: "what you know, what you have, and who you are". Since current technologies rely on a human participation and assume the entity being authenticated is a person, or that a human is involved in authentication procedures, they suffer from various limitations. In particular, the fail to provide a proper answer to the question "who you are" or, in this scenario, "what the apparatus is".

SUMMARY

A review of prior art shows that there is a need for a system and a method for multi-factor (MFA) machine-to machine (M2M) authentication.

A switch to M2M scenario calls for profound modifications in existing authentication techniques. Some of the teachings of this disclosure offer a new model by strategically extending the biometric concept, that is, measurement and analysis of unique physical or behavioral characteristics for verifying identity purposes, to interactions between machines. This new concept may be labeled as "machine-metric".

In general, the present disclosure aims at enabling computers and other devices to interact with each other and exchange authorized information automatically without human intervention and in a safe way.

Aside from that goal, an object of the present disclosure concerns techniques managing third-party additions (third-party sub-systems) in an apparatus and aims at reducing the probability of authenticating an apparatus with a compromised component.

Yet another object is to provide a mechanism for a better detection of any security breaches in trustworthy systems, or compromised components.

Another object of the present disclosure concerns techniques that assure integrity of operations without impacting negatively on autonomy. Autonomy is to be understood in this disclosure as the ability to operate independently from human control.

The disclosed techniques significantly improve security and remove the need of human intervention, which is appropriate for most systems that are not human-oriented. In particular, UAS may benefit from concepts disclosed in this document to assure missions integrity. Unmanned marine systems, objects collecting and exchanging data within the framework of the Internet of Things, industrial robots with elements of autonomy, autonomous software agents, such as certain stock exchange tools and other systems demanding a high level of autonomy can also benefit from this disclosure.

Further objects and advantages of the present invention will be apparent from the following detailed description, reference being made to the accompanying drawings wherein preferred embodiments are clearly illustrated.

DRAWINGS

A series of drawings, which aid in better understanding the disclosure and which are presented as non-limiting examples, are very briefly described below.

FIG. 1 schematically shows an exemplary diagram of a system according to an embodiment.

FIG. 2A schematically shows an apparatus with several critical components.

FIG. 2B schematically shows the apparatus of FIG. 2A with a rogue component.

FIG. 3A schematically shows a dependency network for selected components of a UAS.

Figure 5:
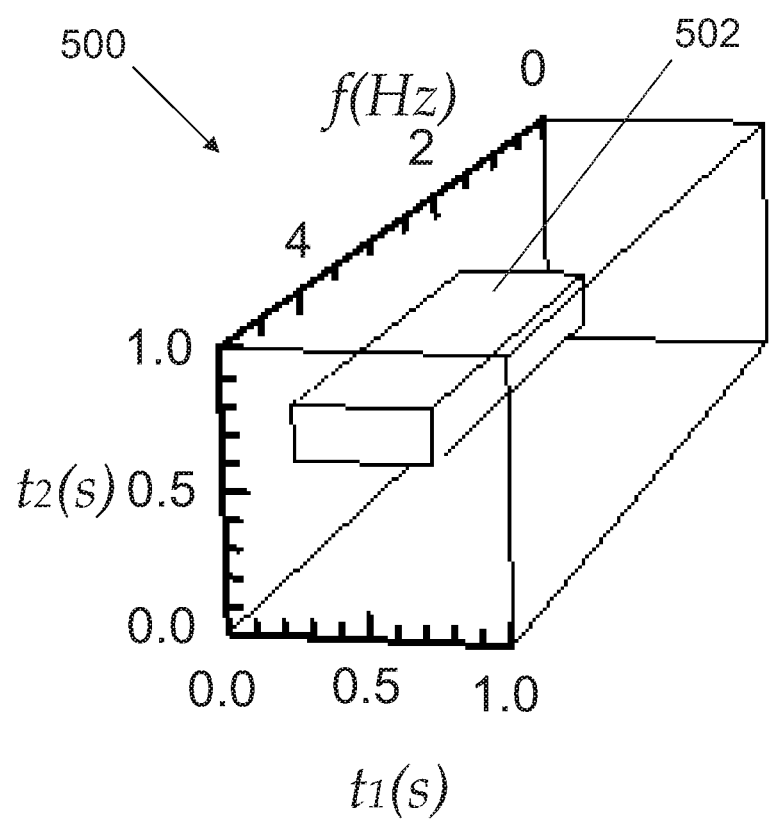

FIG. 5 schematically shows a positive authentication region in a 3-D signature space.

Figure 6:
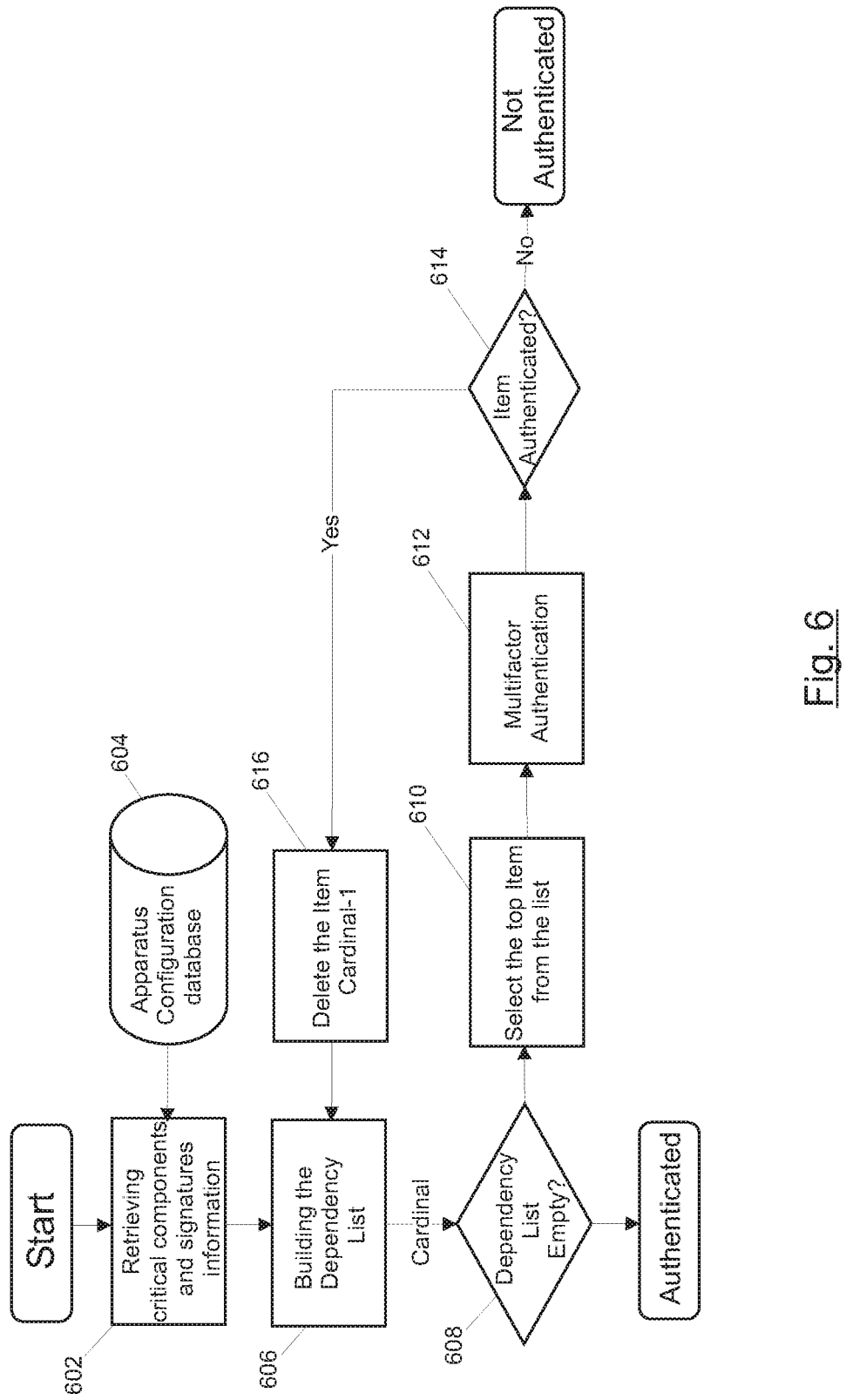

FIG. 6 schematically describes a process for autonomous authentication of an apparatus.

Figure 7:
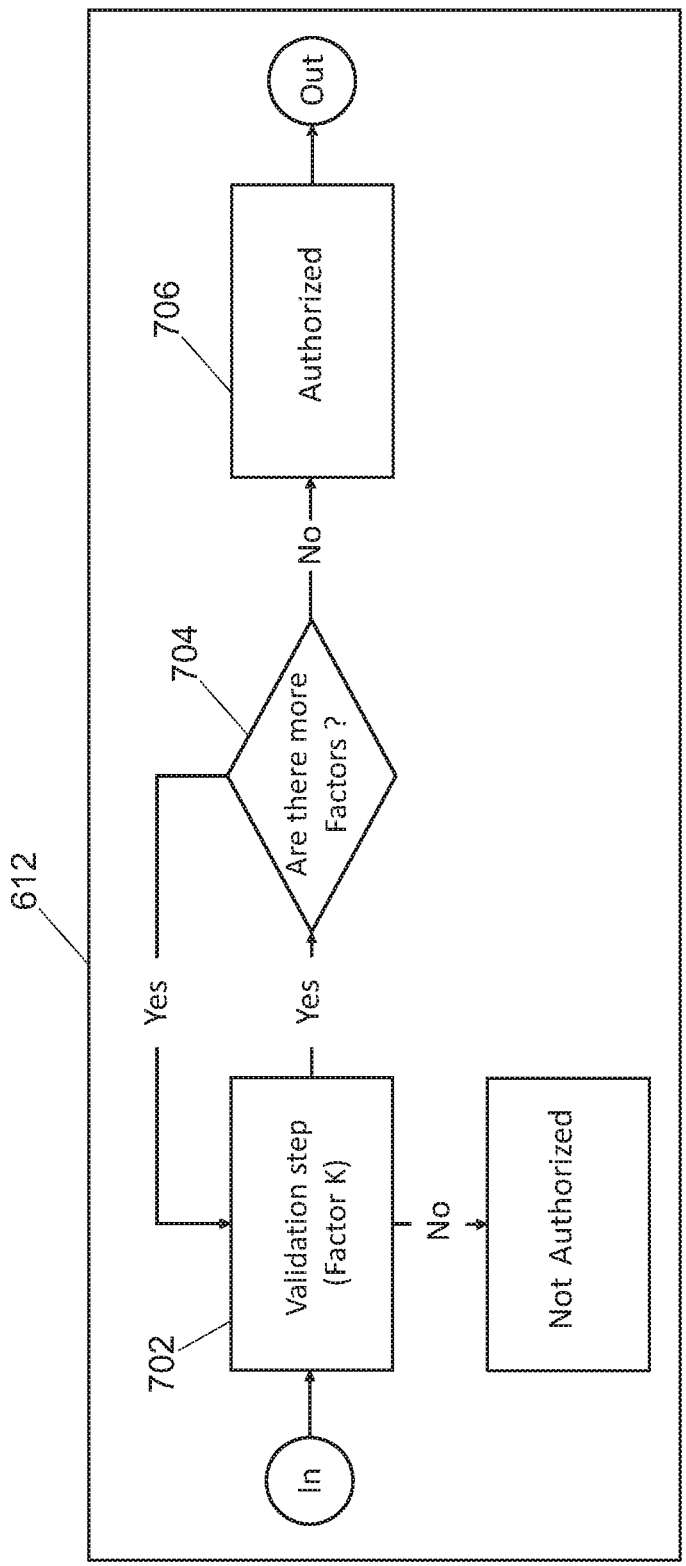

FIG. 7 schematically describes a sub-process of FIG. 6 for multi-factor authentication of a component of an apparatus.

Figure 8:
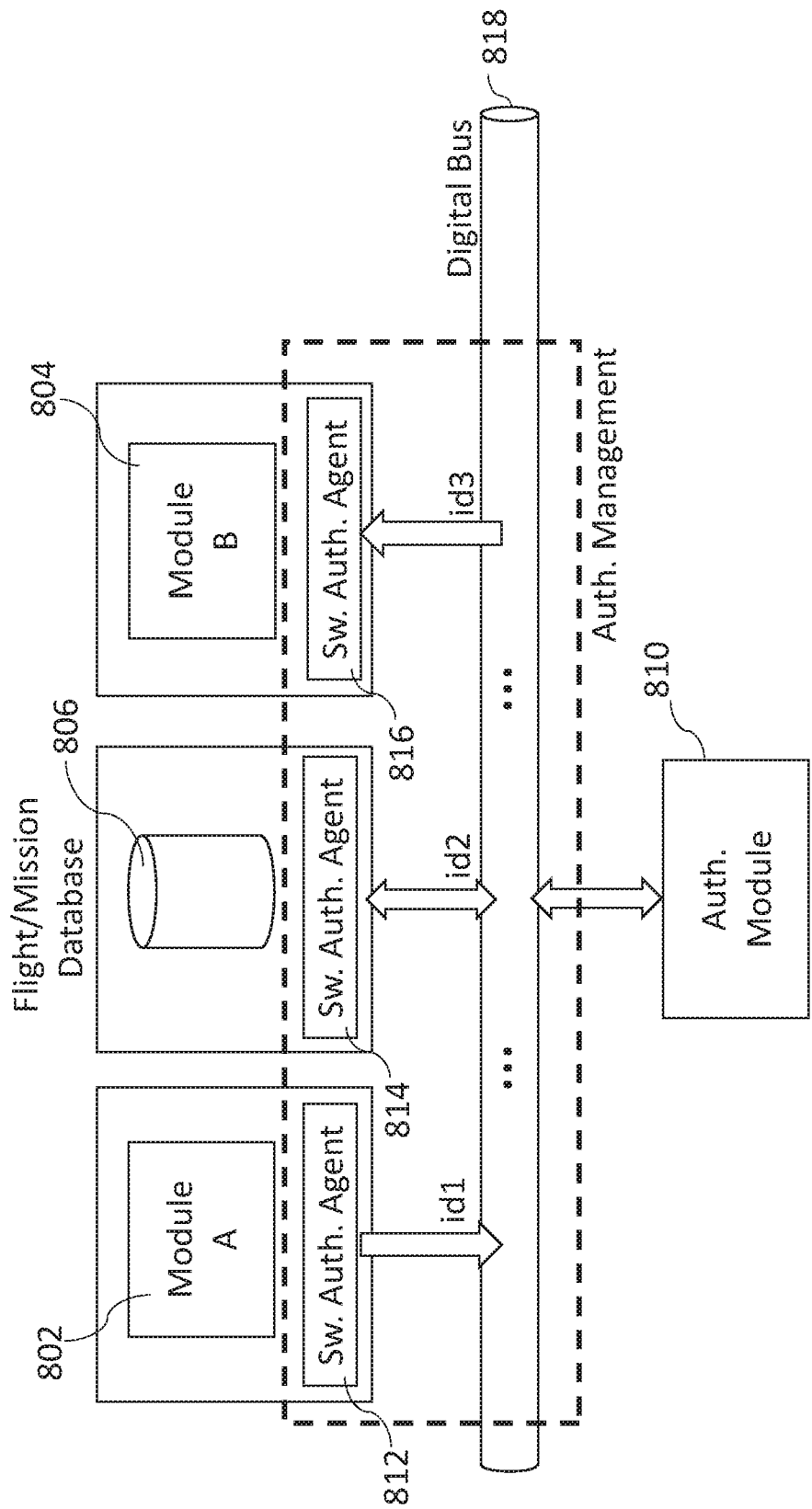

FIG. 8 schematically describes a data transmission architecture to implement component authentication.

Figure 9:
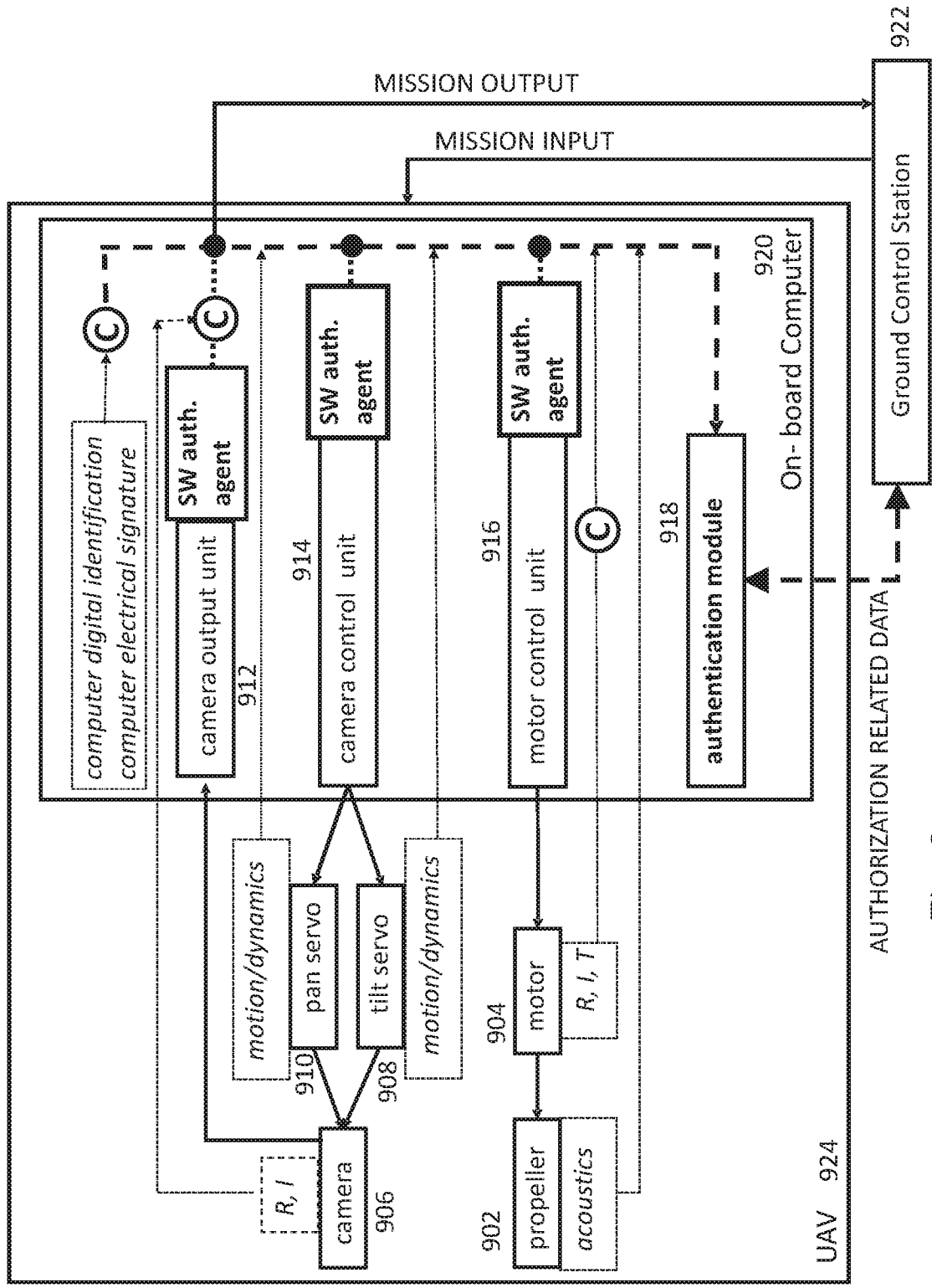

FIG. 9 schematically describes an exemplary architecture to implement component authentication for selected UAV components.

DESCRIPTION

For the purposes of explanation, specific details are set forth in order to provide a thorough understanding of the present disclosure. However, it is apparent to one skilled in the art that the present disclosure may be practiced without these specific details or with equivalent arrangements.

Particularly, the proposed authentication techniques are applicable to all categories of manned and unmanned vehicles, swarms of unmanned vehicles, industrial robots with elements of autonomy, autonomous software agents, such as selected shares management tools and the Internet of Things, in general. However, it will be explained mostly using unmanned aerial systems (UAS) since they serve to explain a variety of operations in complex scenarios with updates to be performed frequently.

Figure 1:
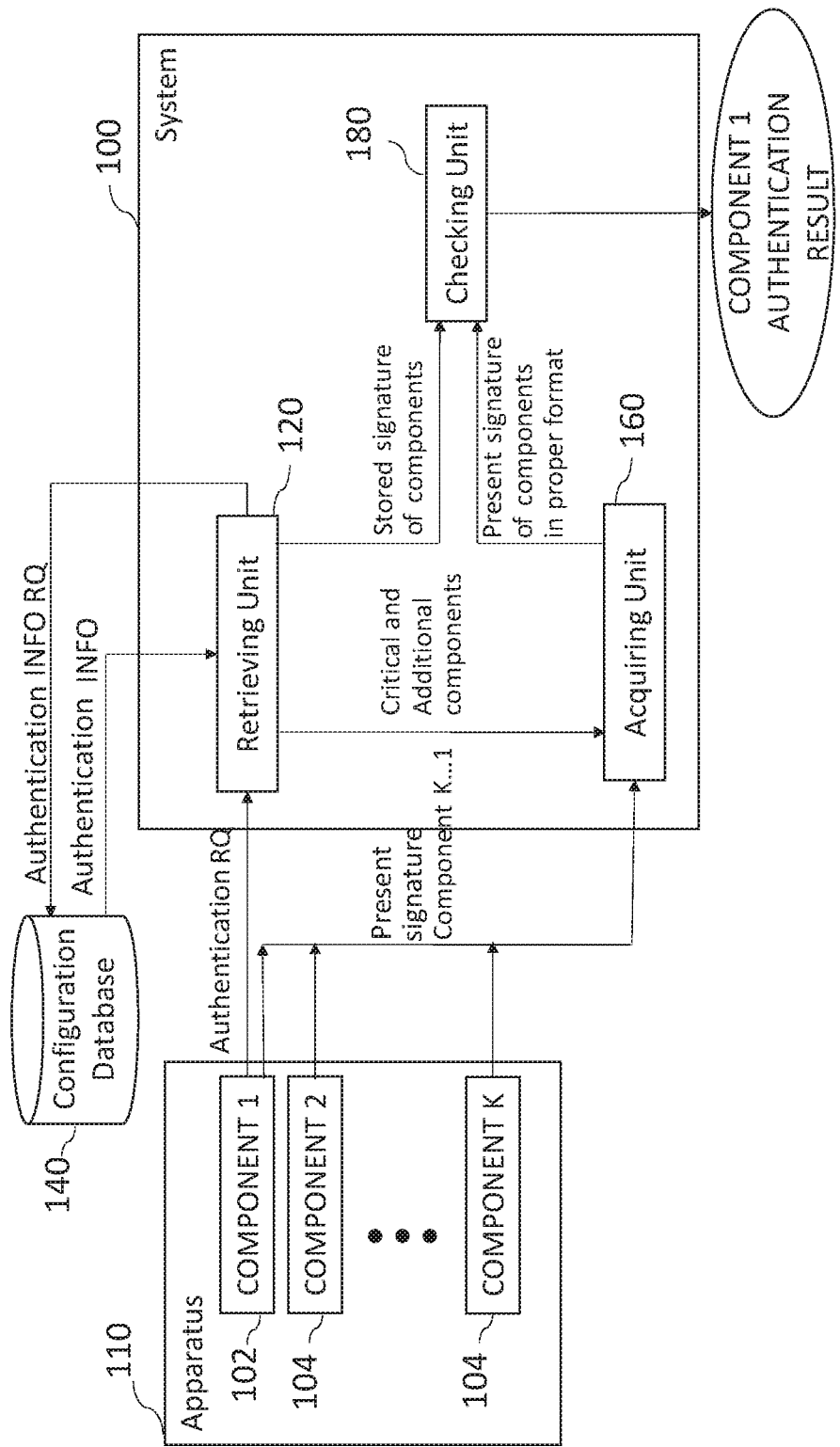

FIG. 1 is a block diagram of a system 100 capable of providing multi-factor M2M authentication to a critical component 102 of an apparatus 110 and thus the apparatus itself. Well-known structures and devices in FIG. 1 are shown in block form to avoid unnecessarily obscuring the present disclosure. A configuration database 140 stores a selection of critical components. The database 140 is illustrated separately, however it may be part of the system 100. Alternatively, the database 140 may be part of the apparatus 110 itself. Similarly, the system 100 may have certain units installed in the apparatus 110.

It may be desirable that, prior to execution of a function or task by the apparatus 110, certain conditions be met. These conditions mainly relate to authentication of critical components, such as component 102 of the apparatus 110 involved in performing such function. The authentication provided by system 100 serves to this purpose.

The apparatus 110 is authenticated when certain number of critical components 102 are validly authenticated. In this fashion, authentication may be established at two different levels. At upper level, in order to authenticate each critical component 102, one or more secondary components 104 having a relationship with a critical component 102 are considered. A dependency network can thus be defined according to relationships among different components 102, 104. At lower lever, each component may require a k-factor authentication. That is, k different signatures of the component must be validly checked.

Referring back to FIG. 1, the apparatus 110 is commanded to perform a function involving the first component 102. To enable this function, a M2M authentication is required. Initially, a retrieving unit 120 of the system 100 sends an authentication request to the apparatus 110 regarding the first component 102. Additionally, the retrieving unit 120 also retrieves a dependency list stored in a configuration database 140. The dependency list comprises authentication information of the first component 102 and one or more additional components 104 associated with the first component 102. The authentication information in the dependency list includes stored values for physical signatures and digital signatures of components 104, 102.

An acquiring unit 160 in the system 100 acquires present signatures for the first component 102 and for each dependent component 104 present in the dependency list. The physical signatures can be acquired by means of sensors. In particular, if the apparatus 110 includes Integrated Vehicle Health Management (IVHM) system in charge of monitoring and determining when a failure occurs, the system 100 may advantageously use tools and assets of the IVHM system to acquire present signatures. In particular, IVHM sensors, such as temperature sensor, vibration sensor, electrical sensors may measure current physical characteristics. The present signatures may need to be converted to a proper format to allow a checking unit 180 of the system 100 to sequentially compare the present signature with the corresponding stored signature for each component. If, as a result of the comparison, signatures are valid, the checking unit 180 authenticates the first component 102. A comparison may be successful even if signatures are not identical but fall within an expected range as will be discussed later. When all critical components 102 are validly authenticated, the apparatus 110 itself is considered authenticated.

Above situation shows the case of authentication was triggered by the event of enabling a certain function of the apparatus 110. Nevertheless, it is also contemplated that authentication may be performed on a time interval basis to constantly assure integrity of the apparatus 110.

Figure 2B:
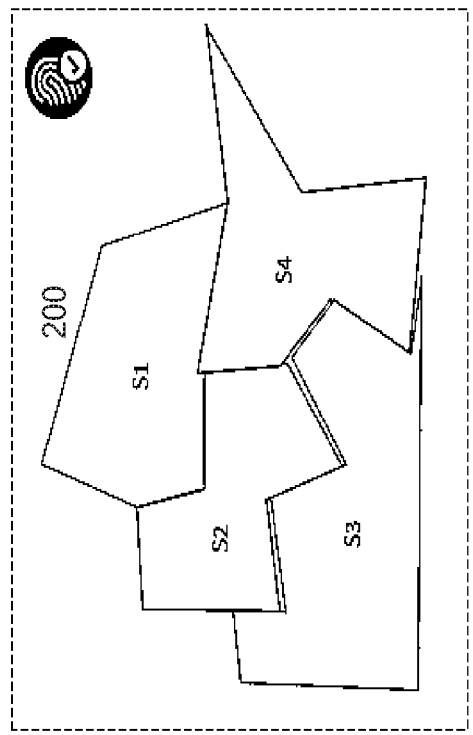
Figure 2A:
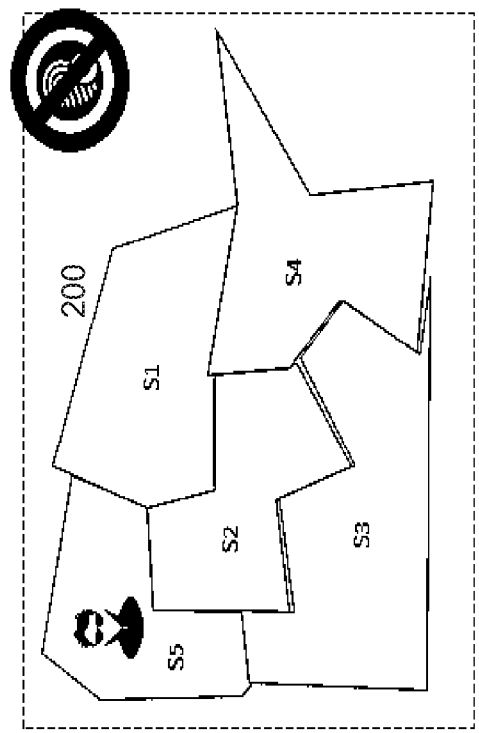

FIG. 2A shows a schematic apparatus 200 consisting of four components labelled as S1, S2, S3 and S4. Let now consider a rogue component S5 added to apparatus 200, as illustrated by FIG. 2B. As a consequence, one or more of the components S1-S4 may be compromised and the apparatus 200 itself. This may lead to malfunction, takeover, or other unexpected or malicious actions.

When conventional upper-level security measures, such as, e.g., IFF-based authentication, are applied, authentication may remain positive although the mission may be compromised with unpredictable consequences.

For instance, if the apparatus 200 is an unmanned air vehicle (UAV) and a critical component is taken over, the UAV can be forced to land at a rogue base instead of home base.

To deal with these security issues, several alternative measures are proposed. Firstly, critical components need to be distinguished as mentioned when discussing FIG. 1. Such critical components may be those that, if compromised, might trigger a general failure. Therefore, it is advisable that they should be continuously monitored and authenticated. This means relevant information exchange among interdependent components in the authentication path, e.g., the platform and on-board cameras.

Generally speaking, initial security processes include the following sequential sub-tasks: identification, authentication and authorization. In the UAS scenario under consideration, authorization is part of a Mission Management System (MMS) and depends completely on the preceding correct identification and authentication. Thus, the techniques proposed herein are mainly focused on the improvement of the two preceding sub-tasks: identification and authentication. These sub-tasks currently involve very frequently human intervention. Instead, the present disclosure proposes a machine-to-machine (M2M) approach that avoids any requirement of human involvement. To that end, a sequential UAS identification/authentication is described in more detail below.

The integrity of an UAS mission depends on a successful identification and authentication of the UAV into the Command and Control (C2) unit. The C2 unit needs to have an exclusive access to and a control over UAVs, including critical components, like on-board operational payloads and subsystems (cameras, sensors, actuators, antennas, data links, etc.). A complete integrity of critical components of the UAV is a condition for safe, sovereign and successful mission execution. Sovereignty is defined in this disclosure as a complete and independent control over an apparatus.

Figure 3B:
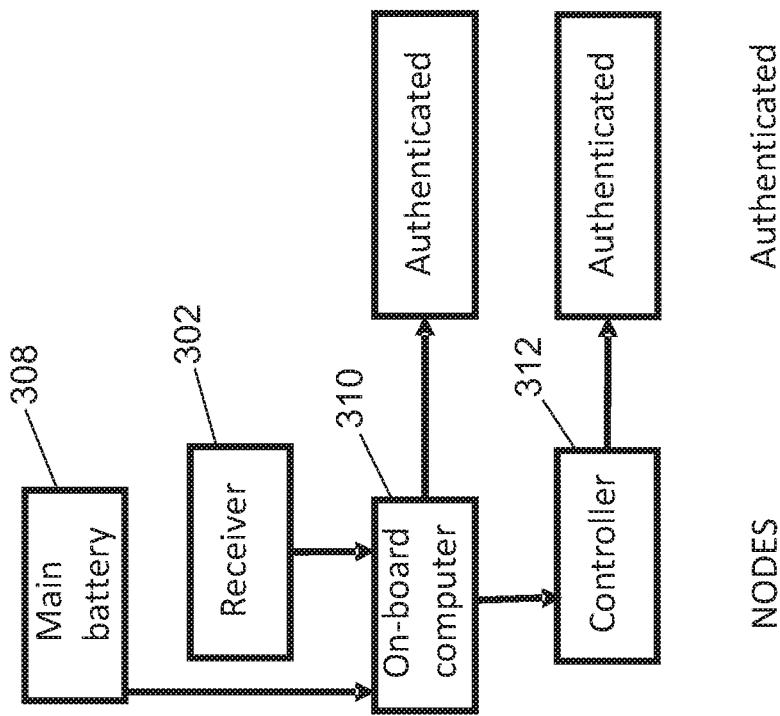
FIG. 3B is a diagram displaying neighbor dependencies of two components in FIG. 3A.
Figure 3A:
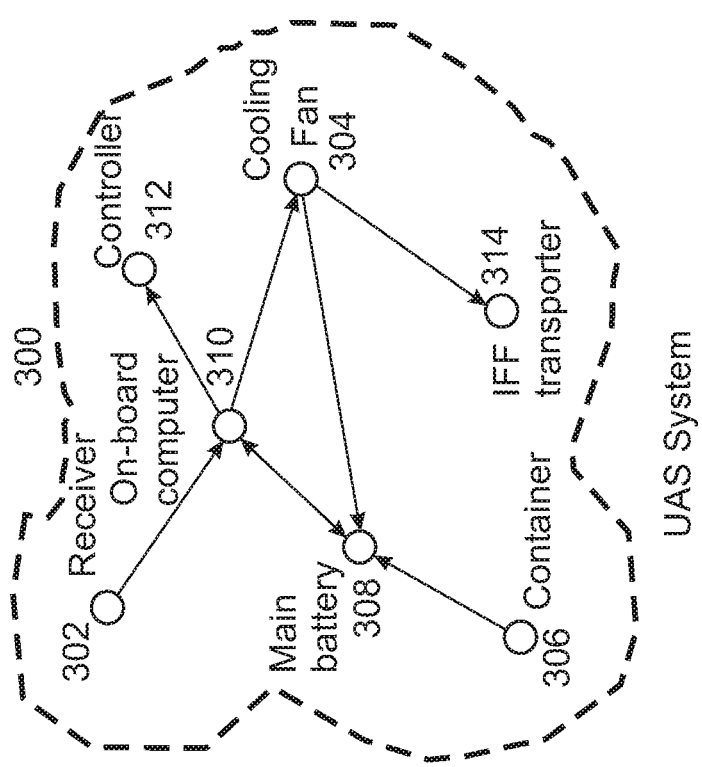

FIG. 3A shows an example of a network of authentication dependencies. A first node points to a second node and arrows indicate dependency on a component. One component is considered validated when all the nodes in the dependency path are already validated. Accordingly, the validation in this network must follow a specific order to accomplish the overall authentication. In this regard, FIG. 3B shows a diagram of components depicting first neighbor dependencies of two exemplary nodes in the network.

In more detail, FIG. 3A relates to a battery-powered UAS, which includes an on-board computer 310 that sends signals to a controller 312, which adjusts power supply to the powerplant. Commands from a Ground Station (not shown) are sent to the on-board computer 310 from a receiver 302. The on-board computer 310 is powered from a main battery 308—placed in a safety container 306 (to mitigate the impact of possible battery overheating and thermal runaway reaction). This on-board-computer 310 also controls a cooling fan 304 used to regulate the temperature of an IFF transponder 314 and the main battery 308.

In this particular case, in order to authenticate the controller 312 and the IFF transponder 314, minimum requirements (retrieved from a dependency list using a configuration database) are to authenticate the on-board computer 310 and the cooling fan 304, respectively. The on-board computer 310 does lend itself easily to digital signature authentication. The cooling fan 304 can be authenticated using its physical characteristics, e.g., fan rotational velocity and the resulting vibrations signature. A suitable sensor is therefore needed to measure its current physical signature. Since a UAV typically includes many on-board sensors, they may be used to obtain the needed physical signatures.

The following sequence of hierarchical authentication relationships are represented in FIGS. 3A and 3B:
  authenticating on-board computer 310 depends on authenticating the receiver 302 and the main battery 308;
  authenticating controller 312 depends on authenticating the on-board computer 310;
Needless to say, the network of authentication dependencies may be extended as needed. E.g., the authentication chains may be extended to other components in the dependency path. E.g., the authentication relationship for the Controller 312 may include not only the on-board computer 310, but also the Receiver 302. Similarly, additional paths may be included for linking the IFF transponder 314 to the on-board computer 310 and to the receiver 302. Besides the UAS scenario, under consideration, this dependency model may also be applied to many other embodiments.

Figure 4:
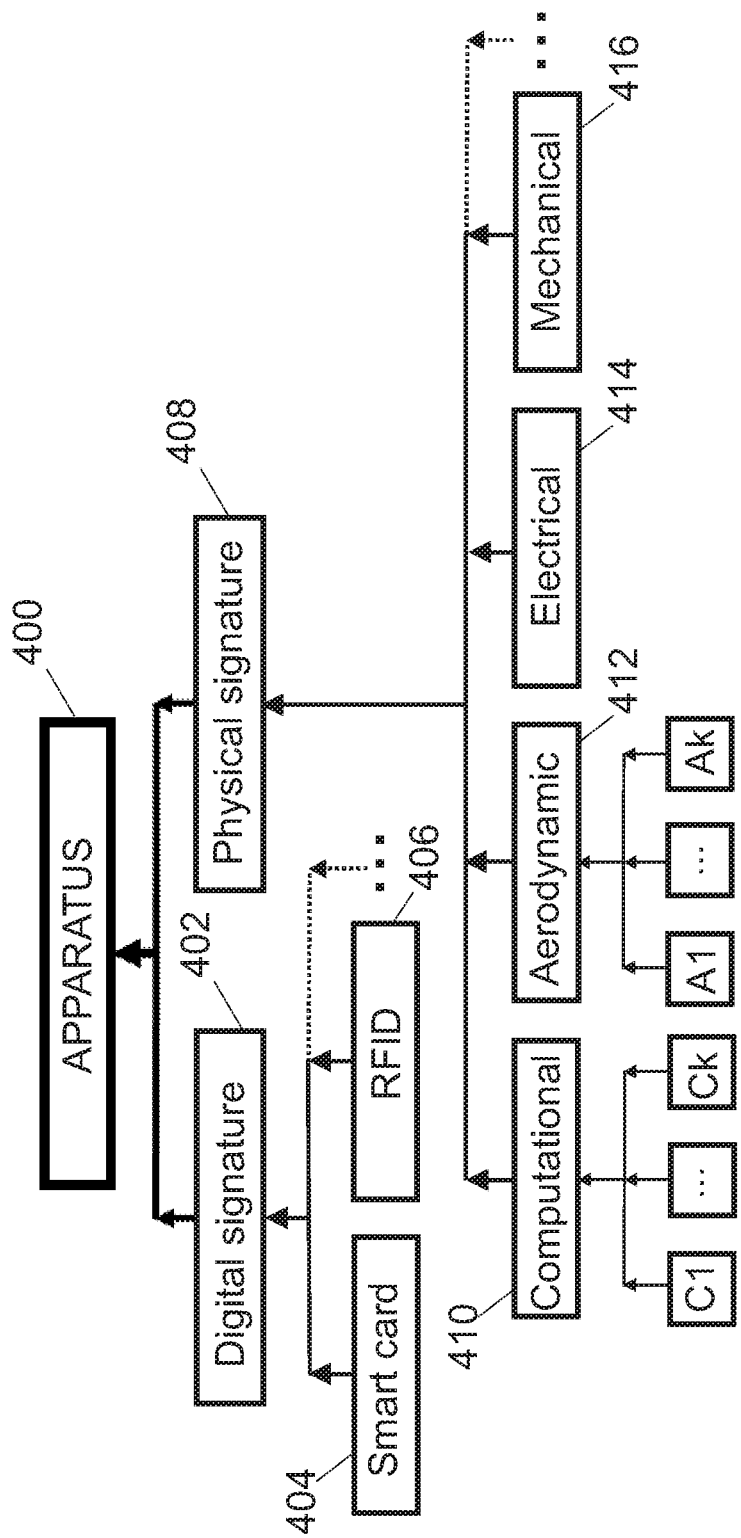
FIG. 4 shows a possible classification of different types of signatures.

FIG. 4 outlines several digital and physical signatures that can be effective in either authenticating the apparatus itself or just a certain single component. In any case, every component of the apparatus that undergoes the authentication must have one or more signatures which may be either physical 408 or digital 404 or both. Digital signatures 404 may be a process ID, a smart card 404 or RFID 406. Physical signatures 408 relate to characteristics that uniquely identify the component. For instance, computational 410, aerodynamic 412, electrical 414, mechanical 416, such as: mechanical vibration signature, volume, shape, albedo, energy consumption pattern, electrical signature, magnetic signature, radio frequency signature or any combination of these. These signatures may need to be converted to a uniform format, and stored in an on-board configuration database.

Processing digital signatures authentication is straightforward and a dedicated algorithm may admit, or not, certain deviations from stored signature values—to account for possible physical data measurement inaccuracies or transfer failures. E.g., the absence of one the digital validations could be considered acceptable. The relaxation of conditions depends on circumstances. See below some cases.

As to the physical signature validation, certain deviations always exist. The proposed solution may need to admit a certain range of expected exact values, to account for unavoidable variations in the physical environment, e.g., temperature variation, boundary condition changes (e.g., on-the-ground or in-flight), etc. If there are k possible independent validation parameters to authenticate a component of the apparatus, these validation parameters define a "machinemetric" space of signatures. This concept is illustrated in FIG. 5.

FIG. 5 graphically shows a three-dimensional space 500 constituted by the following physical signatures for a given UAV: first modal frequency of a selected subsystem f(Hz), the time lag in current rise after applying a step thrust input t1 and a time lag in fuselage pitch after applying a step input to the elevator t2.

To improve robustness, as previously discussed, valid confidence intervals are defined for the expected values of signatures. If values fall within certain ranges, the signature may be valid. For instance, as depicted in the parallelepiped 502 of FIG. 5: 2.0 Hz<f(Hz)<4.5 Hz, 0.1 s<t1<0.6 s and 0.5 s<t2<0.7 s. Thus, the UAV is successfully authenticated if parameters obtained fall within these ranges.

FIG. 6 shows a simplified flowchart of several operations performed to authenticate an apparatus according to an example. The flowchart includes a retrieving step 602 from a configuration database 604 for obtaining a set of n critical components of the apparatus that need to be authenticated. Then a building step 606 builds a dependency list for the n critical components. Once the dependency list is prepared, a loop runs n times and performs a selecting step 610 to take an element from the dependency list. This element is processed and verified according to a multifactor authentication process 612. The multifactor authentication runs in a loop over all the dimensions of the "machinemetrics" space of signatures (factors). The process of multifactor authentication 612 for each single component is depicted in FIG. 7. Each time the result of checking step 614 for the given element is positive the component is authenticated. Once the checking step 608 indicates that the dependency list is empty, the apparatus authentication is positive. Please note that the authentication fails when a first critical component is deemed "Not Authenticated."

FIG. 7 shows a lower-level authentication 612 in another simplified flowchart. This is an internal loop within the process depicted in FIG. 6. A component is k-factor authenticated, when each of the k signatures associated with the given critical component is validly checked. A component having k signatures needs to pass the validation step 702 k-times. Every time a signature is valid, the next one is processed until checking 704 there are no more signatures associated with that component (or alternatively there is a "Not Authenticated" result). Therefore, the component authentication 706 is positive provided all k signatures are validly checked. This component-level authentication process should be performed for a single component either periodically or asynchronously (e.g., whenever a new component is added).

If the apparatus is a UAV 300, adding a new component requires updating the configuration database 604. That may be accomplished through an automatic process, or requested directly by the Command and Control (C2) unit. The loss of authentication for one, or more critical components results in an overall loss of authentication. That event may automatically trigger pre-defined security contingency actions. These actions may include information exchange with the C2 unit, launching a re-authentication process, return to home base, discontinuing flight/mission tasks, destruction of the UAV 300, etc. The way to proceed with the apparatus after the authentication failure falls outside of the scope of this present disclosure.

FIG. 8 shows a data transmission architecture for implementation of the present teachings in a UAV 300. One of the key pieces of this architecture is an authentication module 810. This authentication module 810 monitors physical changes and correlates with any identity change because it is linked with a Flight/Mission database 806. The authentication module 810 executes tasks of identification and authentication for each critical component. There is a correspondence of this architecture with the block diagram of FIG. 1. The authentication module 810 is a possible SW implementation for a UAV of the retrieving unit 120 and the checking unit 180. Flight/Mission database 806 also stores authentication information for UAV components like the configuration database 140.

Each component of the UAV considered critical undergoes an individual authentication, those less-critical may require only a simple certificate-based authentication, while those considered essential may require a multifactor authentication as previously discussed. The authentication module 810 is in charge of evaluating the authentication status. Depending on the situation, it may either grant or deny positive authentication or send a relevant recommendation to the C2 unit.

Most of UAVs are equipped with a digital bus 818 to facilitate data exchange among various components (e.g., avionics and sensors). Secure data exchange through the digital bus 818 requires applying a full three-step security process (identification, authentication, authorization) provided by the authentication module 810. Data sent through this bus 818 may be continuously monitored by the authentication module 810 to detect and authenticate any new component connected to the bus 818. Security requirements imply that identity be validated each time the UAV sends/receives data through the bus 818 (similarly to labels in the standard ARINC 429 and virtual links in the ARINC Specification 664 Part 7).

In some cases, an end-to-end communication needs some other modules to mediate or complete the communication. Modules may be seen as a single component or a group of components, that is a sub-system, which is authenticated together. One of the benefits of the present architecture is the ability to authenticate data from already positively identified sources. As depicted in FIG. 8, a Module A 802 writes data to the bus 818, and the Module B 804 reads this data together with flight data from a flight database 806 that successfully passed the identification and authentication process. Authentication agents 812, 816, 814 are preferably software applications automatically generated and distributed by the authentication module 810 to manage the main tasks of authentication and to intermediate between the digital bus 818 and a module in question. Authentication agents 812, 816, 814 serves. The role of authentication agents 812, 814, 816 is described below. Authentication agents check module integrity, pass the authentication information to the authentication module and control input/output of the corresponding module.

The architecture of FIG. 8 allows to insert a dynamic authorization between the data layer (bus 818) and the application layer (module A 802, Module B 804 and sources of data such as flight and mission database 806). If one of the modules is not identified or authenticated (or even not authorized), an associated agent 812, 816, 814 notifies the authentication module 810 which may disconnect the unidentified module from the bus 818, or reduce the level of trust following the already defined trust model, depending the level of importance of such module functionality. User-defined trust model is needed for secure agents' cooperation.

The level of trust, the status of identification or authentication, for each component of the UAV 300 can be queried from a proxy table built from the flight database 806. This proxy table contains updated authentication status of all the components. Its data are public and accessible for all the authentication agents 812, 816, 814. If an authentication module 810 decides to deny authentication to a module, this module's status in the proxy table is updated and the corresponding agent acts accordingly. Each authentication agent 812, 816, 814 reads the proxy table prior the action of denying/accepting data in question into the bus 818. It is noted that many implementation details may vary depending on architecture or resources requirements. E.g., the authentication agent might only test module's integrity and inform the authentication module about results, or test and take any action the authentication module would decide on.

FIG. 9 presents another exemplary embodiment of system 100 for a UAS which includes the UAV 924 and ground control station 922. Digital and physical signatures used for the authentication of specific components are shown in thin dotted lines, using italics. The authentication path of the system 100 is shown in bold dotted lines. In this particular embodiment, system 100 is part of the main on-board computer of the UAV 924. Multifactor authentication is indicated with an encircled capital C.

Authentication of the motor 904 is performed using physical signatures. In particular, electrical signatures (resistance (R) and current (I)) and also temperature (T), for a given flight mode. Authentication of the on-board computer 920 is performed using a physical and a digital signature, (computer digital identification and computer electrical voltage). For the motor 904 and other components, any relevant control software characteristics could be also used for multifactor authentication.

The UAV 924 receives mission input from the ground control station 922. The on-board computer 920 processes the mission input, performs tasks depending on that input (such as camera control or particular navigation tasks) and executes tasks independent of the input from Ground Control Station, such as obstacle detection and avoidance.

Assume that, for a certain mission, the authentication of the UAV 924 would require authenticating a motor 904 as one of the critical components. The related authentication process would be a typical one based on the disclosed "machinemetrics" approach. The authentication of motor 904 requires not only authenticating its physical signatures through checking whether they fall within expected ranges for electrical resistance, R, a range for current, I, and a range for temperature, T but it depends also on the positive authentication of neighboring components: the motor control unit 916 and propeller 902. The software authentication agent compares the digital signature of the motor control unit 916 against authentication information stored in the proxy table. This may be, for example, information related to the timing of stator coils energizing sequence. The pass/fail information regarding motor control unit 916 authentication is, then, passed to the authentication module 918. Please note that the authentication procedure of the motor control unit 916 may be further extended through, for example, checking its thermal signature. Similarly, the information on propeller's acoustic signature corresponding to the power input consistent with controller 916 signature, is passed to the authentication module 918. Only if all the authentication steps are passed the authentication module 918 deems the motor 904 authenticated. If not, the authentication module 918 acts accordingly. For example, it may command the authentication agent to modify the motor control unit 916 operation, so that the power supply to the motor is reduced and the UAV 924 forced to land. Similarly, the dependency path of the camera 906 includes the servo system including a pan servo 910 and tilt servo 910, and the on-board computer 920. Both the computer and the camera need to be authenticated through multifactor authentication.

Further, the disclosure comprises examples according to the following clauses:

Clause 1. A machine-to-machine method of authentication comprising the steps of:

i) identifying at least one critical component (102) of an apparatus (110) in response to an authentication request for the apparatus (110);

ii) retrieving authentication information for the critical component (102), wherein the authentication information comprises a plurality of expected physical and digital signatures for the critical component (102) and at least one additional component (104) associated with the critical component (102);

iii) acquiring present signatures for the critical component (102) and the at least one additional component (104); and iv) for each component (102, 104), checking validity of each present signature with the corresponding expected signature and authenticating the apparatus (110) if signatures for each component (102, 104) are valid.

Clause 2. The method of authentication according to Clause 1, wherein authentication information for the critical component (102) comprises a dependency list with a sequence of additional components (104) associated with the critical component (102) to be sequentially checked.

Clause 3. The method of authentication according to Clause 1 or 2, wherein identifying the critical component (102) depends on the function to be performed by the apparatus (110).

Clause 4. The method of authentication according to any of Clauses 1 to 3, wherein, upon an event occurs in the apparatus (110), an authentication request is triggered.

Clause 5. The method of authentication according to any of Clauses 1 to 4, wherein the authentication request for the apparatus (110) is periodically triggered.

Clause 6. The method of authentication according to any of Clauses 1 to 5, wherein physical signatures of components (102, 104) are acquired from measures of sensors of the apparatus (110).

Clause 7. The method of authentication according to any of Clauses 1 to 6, wherein one or more signatures of components (102, 104) are acquired by communicating with an Integrated Vehicle Health Management system monitoring the apparatus (110).

Clause 8. The method of authentication according to any of Clauses 1 to 7, wherein physical signatures of components (102, 104) are converted to a digital format to be stored or checked.

Clause 9. The method of authentication according to any of Clauses 1 to 8, wherein a present signature is valid when it is within a predefined range of the corresponding expected signature.

Clause 10. A system for machine-to-machine authentication of an apparatus (110) comprising:

i) a retrieving unit (120) configured to identify at least one critical component (102) of an apparatus (110) in response to an authentication request for the apparatus (110), the retrieving unit (120) further configured to retrieve authentication information for the critical component (102), wherein the authentication information comprises a plurality of expected physical and digital signatures for the critical component (102) and at least one additional component (104) associated therewith;

ii) an acquiring unit (160) configured acquire present signatures for the critical component (102) and the at least one additional component (104); and iii) for each component (102, 104), a checking unit (180) configured to check validity of each present signature with the corresponding expected signature, the checking unit (180) further configured to authenticate the apparatus (110) if signatures for each component (102, 104) are valid.

Clause 11. The system according to Clause 10, further comprising a configuration database (140) for storing expected signatures of components (102, 104) of the apparatus (110).

Clause 12. The system according to Clause 10 or 11, further comprising sensors for measuring physical signatures of components (102, 104) of the apparatus (110).

Clause 13. The system according to any of Clauses 10 or 11, wherein the acquiring unit (160) is configured to acquire physical signatures of components (102, 104) from sensors of the apparatus (110).

Clause 14. The system according to any of Clauses 10 or 11, wherein the acquiring unit (160) is configured to communicate with an Integrated Vehicle Health Management system monitoring the apparatus (110) to acquire physical or digital signatures.

Clause 15. A computer program product for machine-to-machine authentication of an apparatus, comprising computer code instructions that, when executed by a processor, causes the processor to perform the method of any of Clauses 1 to 9.

These and other features, functions, and advantages that have been discussed can be achieved independently in various embodiments or may be combined in yet other embodiments.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for machine-to-machine authentication of an apparatus, the method comprising:
   identifying at least one critical component of the apparatus in response to an authentication request for the apparatus;
   retrieving authentication information for the at least one critical component, wherein the authentication information comprises a plurality of expected physical and digital signatures for the at least one critical component and at least one additional component associated with the at least one critical component, and
   wherein the authentication information for the at least one critical component comprises a dependency list with a sequence of additional components associated with the at least one critical component to be sequentially checked;
   acquiring present physical and digital signatures for the at least one critical component and the at least one additional component; and
   for each of the components, checking validity of each of the present physical and digital signatures with the corresponding expected physical and digital signatures, and authenticating the apparatus if the present physical and digital signatures for each of the components are valid.

2. The method of claim 1, wherein the identifying of the at least one critical component depends on a function to be performed by the apparatus.

3. The method of claim 1, wherein upon an event occurring in the apparatus, the authentication request is triggered.

4. The method of claim 1, wherein the authentication request for the apparatus is periodically triggered.

5. The method of claim 1, wherein the present physical signatures of the components are acquired from measurements taken by sensors of the apparatus.

6. The method of claim 5, wherein the sensors of the apparatus comprise at least one of a temperature sensor, vibration sensor, electrical sensor, or a combination thereof.

7. The method of claim 1, wherein at least one of the present physical signatures of the components is acquired by communicating with an Integrated Vehicle Health Management (IVHM) system monitoring the apparatus.

8. The method of claim 1, wherein the present physical signatures of the components are converted to a digital format to be stored or checked.

9. The method of claim 1, wherein when one of the present physical signatures is within a predefined range of the corresponding expected physical signature for that one of the present physical signatures, then that one of the present physical signatures is valid.

10. The method of claim 1, wherein the present physical signatures are related to at least one of a mechanical vibration signature, volume, shape, albedo, energy consumption pattern, electrical signature, magnetic signature, radio frequency signature, or a combination thereof.

11. The method of claim 1, wherein the method further comprises:
   producing, by a computer program product for machine-to-machine authentication of the apparatus, computer code instructions; and
   executing, by a processor, the computer code instructions to perform the method.

12. The method of claim 1, wherein the present digital signatures are related to at least one of a process identification (ID), a smart card, a radio frequency identification (RFID), or a combination thereof.

13. A system for machine-to-machine authentication of an apparatus, the system comprising:
   a retrieving unit configured to identify at least one critical component of an apparatus in response to an authentication request for the apparatus, the retrieving unit further configured to retrieve authentication information for the at least one critical component, wherein the authentication information comprises a plurality of expected physical and digital signatures for the at least one critical component and at least one additional component associated with the at least one critical component, and
   wherein the authentication information for the at least one critical component comprises a dependency list with a sequence of additional components associated with the at least one critical component to be sequentially checked;
   an acquiring unit configured to acquire present physical and digital signatures for the at least one critical component and the at least one additional component; and
   for each of the components, a checking unit configured to check validity of each of the present physical and digital signatures with the corresponding expected physical and digital signatures, the checking unit further configured to authenticate the apparatus if the present physical and digital signatures for each of the components are valid.

14. The system of claim 13, further comprising a configuration database for storing the expected physical and digital signatures of the components of the apparatus.

15. The system of claim 13, further comprising sensors for measuring the present physical signatures of the components of the apparatus.

16. The system of claim 13, wherein the acquiring unit is configured to acquire the present physical signatures of the components from sensors of the apparatus.

17. The system of claim 16, wherein the sensors of the apparatus comprise at least one of a temperature sensor, vibration sensor, electrical sensor, or a combination thereof.

18. The system of claim 13, wherein the acquiring unit is configured to communicate with an Integrated Vehicle Health Management (IVHM) system monitoring the apparatus to acquire the present physical or digital signatures.

19. The system of claim 13, wherein the present physical signatures are related to at least one of a mechanical vibration signature, volume, shape, albedo, energy consumption pattern, electrical signature, magnetic signature, radio frequency signature, or a combination thereof.

20. The system of claim 13, wherein the present digital signatures are related to at least one of a process identification (ID), a smart card, a radio frequency identification (RFID), or a combination thereof.

* * * * *